(12) United States Patent
Parada et al.

(10) Patent No.: US 6,795,585 B1
(45) Date of Patent: *Sep. 21, 2004

(54) REPRESENTING DIGITAL IMAGES IN A PLURALITY OF IMAGE PROCESSING STATES

(75) Inventors: Robert J. Parada, Rochester, NY (US); Edward B. Gindele, Rochester, NY (US); Ann L. McCarthy, Pittsford, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/354,808

(22) Filed: Jul. 16, 1999

(51) Int. Cl.[7] .................................................. G06K 9/40
(52) U.S. Cl. ...................... 382/254; 382/162; 382/240; 382/254; 358/523
(58) Field of Search .................................. 382/254, 162, 382/523, 136, 1.9, 284, 260, 49, 173, 181, 224, 226

(56) References Cited

U.S. PATENT DOCUMENTS

| | | | |
|---|---|---|---|
| 4,417,270 A | | 11/1983 | Nagao et al. |
| 4,663,660 A | * | 5/1987 | Fedele et al. ................ 358/136 |
| 4,674,125 A | * | 6/1987 | Carlson et al. .............. 382/303 |
| 5,122,873 A | | 6/1992 | Golin |
| 5,268,754 A | | 12/1993 | Van DeCapelle et al. |
| 5,317,425 A | | 5/1994 | Spence et al. |
| 5,333,069 A | | 7/1994 | Spence |
| 5,420,967 A | | 5/1995 | Delp |
| 5,510,910 A | | 4/1996 | Bockman et al. |
| 5,654,820 A | * | 8/1997 | Lu et al. ...................... 359/298 |
| 5,666,215 A | | 9/1997 | Fredlund et al. |
| 5,713,062 A | | 1/1998 | Goodman et al. |
| 5,757,372 A | | 5/1998 | Weiss et al. |
| 5,760,386 A | | 6/1998 | Ward |
| 5,852,565 A | | 12/1998 | Demos |
| 5,930,405 A | * | 7/1999 | Chida .......................... 382/284 |
| 5,949,967 A | | 9/1999 | Spaulding et al. |
| 5,983,251 A | * | 11/1999 | Martens et al. .............. 708/203 |
| 5,990,931 A | | 11/1999 | Nimri et al. |
| 6,285,784 B1 | * | 9/2001 | Spaulding et al. .......... 382/162 |
| 6,301,393 B1 | * | 10/2001 | Spaulding et al. .......... 382/240 |
| 6,314,198 B1 | * | 11/2001 | Ogura ........................ 382/132 |
| 6,335,983 B1 | * | 1/2002 | McCarthy et al. .......... 382/162 |
| 6,459,500 B1 | * | 10/2002 | Takaoka ..................... 358/1.9 |
| 6,707,950 B1 | * | 3/2004 | Burns et al. ................ 382/254 |
| 2002/0118887 A1 | * | 8/2002 | Gindele ...................... 382/260 |
| 2003/0161520 A1 | * | 8/2003 | Yamano et al. ............. 382/128 |

FOREIGN PATENT DOCUMENTS

WO    98/22588    7/1996

OTHER PUBLICATIONS

Livieratos, L.; Meikle, S.R.; Matthews, J.C.; Bailey, D.L.; Jones, T.; Price, P.; Nuclear Science Symposium, 1997. IEEE, vol. 2, Nov. 9–15, 1997, vol.: 2, pp.: 1175–1178.*

* cited by examiner

*Primary Examiner*—Kimberly Williams
*Assistant Examiner*—Melanie Vida
(74) *Attorney, Agent, or Firm*—Raymond L. Owens

(57) ABSTRACT

A method for representing a digital image in a plurality of image processing states using at least one reference digital image and at least one residual image comprising the steps of manipulating an input digital image using at least one digital image processing enhancement step to form at least one additional digital image in a different image processing state; designating at least one of the digital images to be a reference digital image in a reference image processing state; and determining at least one residual image representing differences between one of the reference digital images and one of the additional digital images, whereby the residual image(s) and the reference digital image(s) can be used to form digital image(s) in different image processing states.

36 Claims, 5 Drawing Sheets

REPRESENTING DIGITAL IMAGES IN A PLURALITY OF IMAGE PROCESSING STATES

CROSS REFERENCE TO RELATED APPLICATIONS

Reference is made to commonly assigned U.S. Pat. No. 6,282,313, entitled "Using a Set of Residual Images to Represent an Extended Color Gamut Digital Image" to McCarthy et al; U.S. Pat. No. 6,335,983, entitled "Representing an Extended Color Gamut Digital Image in a Limited Color Gamut Color Space" to McCarthy et al; U.S. Pat. No. 6,282,311, entitled "Using a Residual Image to Represent an Extended Color Gamut. Digital Image" to McCarthy et al; U.S. Pat. No. 6,285,784 entitled "Method of Applying Manipulations to an Extended Color Gamut Digital Image" to Spaulding et al; and U.S. Pat. No. 6,282,312, entitled "A System Using One or More Residual Image(s) to Represent an Extended Color Gamut Digital Image" to McCarthy et al, the disclosures of which are incorporated herein by reference.

FIELD OF THE INVENTION

The present invention relates to the field of digital imaging and, more precisely, to representing one or more digital images in a plurality of image processing states through the use of residual images.

BACKGROUND OF THE INVENTION

In forming digital images, an input digital image (in a predetermined image processing state) can be processed through a series of digital image processing enhancement steps. At the output of each digital image processing enhancement step, a digital image in another image processing state is produced. The image processing state inherent in any digital image is the result of the image source and the image processing that has been applied to the image, and is an indicator of the image information attributes retained in the image. For example, a digital image from a digital camera in a first, unsharpened, image processing state, can be processed by a digital image processing system that sharpens the digital image to produce a digital image in a second, sharpened, image processing state. If desired, this digital image can be processed by subsequent digital image processing enhancement steps where, for example, it can be color corrected, defect corrected, resampled, etc., to form a series of digital images in different image processing states. This arrangement is well known in the art. For example, see Delp (U.S. Pat. No. 5,420,967).

Generally, digital image processing systems produce a single digital image in some final image processing state. The final digital image can be stored in a digital storage device and/or displayed on an output device. A problem with this digital image processing scheme is that it lacks flexibility; it is not possible to go back at a later time and change any of the intermediate processing operations. For example, the digital image processing enhancement steps needed to produce an optimal digital image for one output device may produce a digital image that is sub-optimal for a different output device. For example, it may be desirable to apply a greater amount of sharpening for one output device and a lesser amount of sharpening for a different output device.

An alternative to the above image processing scheme is to store multiple digital images—each representing a different image processing state. Though this approach permits the digital image processing enhancement steps to be tailored for different uses, it has the disadvantage that a relatively large amount of digital memory can be required to store the full set of digital images.

Various other methods have been developed to provide some means of adapting a digital image from one intended use to another. For example, certain image processing operations may make use of non-image information, conveying image characteristics, in order to properly adapt subsequent processing parameters when modifying the digital image for another use. Non-image information, or metadata, refers to data that is carried along with each digital image and provides information about the capture conditions, capture devices, expected noise statistics, prior image processing operations, etc. An example of this type of image processing operation is image-dependent sharpening, where a measure of the imaging chain Modulation Transfer Function (MTF) could be used to adaptively change the sharpening applied to the digital image. During the processing of image information in a multi-stage imaging system, however, the non-image data is usually affected by every operation or transformation applied to the digital image. If this impact on the non-image data is not taken into account, then subsequent operations that make use of these data will not operate as intended and system performance (i.e. image quality) may suffer.

Another approach to providing flexible image processing that is well-known in the art involves the creation of a list of image processing commands, i.e., an image processing script, that is associated with the unchanged original digital image. In this case, the image processing script is applied to a copy of the original digital image to produce one desired output. When an alternative output is desired, the script can be modified and a copy of the original digital image can be processed through the revised script to create the alternative output. One drawback of this approach is that, as a digital image is conveyed from one imaging system to another, the interpretation of the commands in the associated image processing script may vary. This may result in unacceptable changes in the appearance of the digital image when it is processed through the script and displayed. Another disadvantage to this approach is that the digital image must always be processed before it is ready for use. This may result in unacceptable decreases in system throughput.

In general, when an image is rendered for a particular output, device characteristics pertinent to that output are used in that rendering. For example, the color gamut of the device and the MTF and resolution of the device, may be used to determine the color encoding and final sharpening applied to the image, respectively. As a result, a device-specific output prepared from an original image is typically preferred over a second-generation output prepared from a previously determined output image.

SUMMARY OF THE INVENTION

It is an object of the present invention to overcome the limitations of the prior art by providing a flexible arrangement for representing digital images in a plurality of image processing states. It has been recognized that the drawbacks of the prior arrangements can be mitigated, by providing a way to revise or redirect the intermediate image processing operations used to produce the final digital image.

This object is achieved by a method for representing a digital image in a plurality of image processing states using at least one reference digital image and at least one residual image comprising the steps of:

a) manipulating an input digital image using at least one digital image processing enhancement step to form at least one additional digital image in a different image processing state;

b) designating at least one of the digital images to be a reference digital image in a reference image processing state; and c) determining at least one residual image representing differences between one of the reference digital images and one of the additional digital images, whereby the residual image(s) and the reference digital image(s) can be used to form digital image(s) in different image processing states.

It is an advantage of the present invention that, by using at least one residual image and at least one of the reference digital images, digital images can be formed in different image processing states. These image processing states can be reconstructions of original image processing states or can be new image processing states.

It also has the advantage that information about multiple, different image processing states can be retained without needing to store a full image for each different image processing state in digital memory.

It has the further advantage that a special rendering engine is not required to process a digital image from one image processing state to another.

It has the additional advantage that the use of the residual image(s) is optional. As a result, the benefits of the residual image(s) can be gained by applications that are able to make use of the information, without introducing an image-quality or computational penalty for applications that do not require the optional information or that are not able to make use of it.

DETAILED DESCRIPTION OF THE INVENTION

Figure 1:
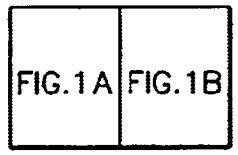
FIG. 1 is a schematic showing various image processing states that can be used in accordance with the present invention to form independent residual images.
Figure 1A:
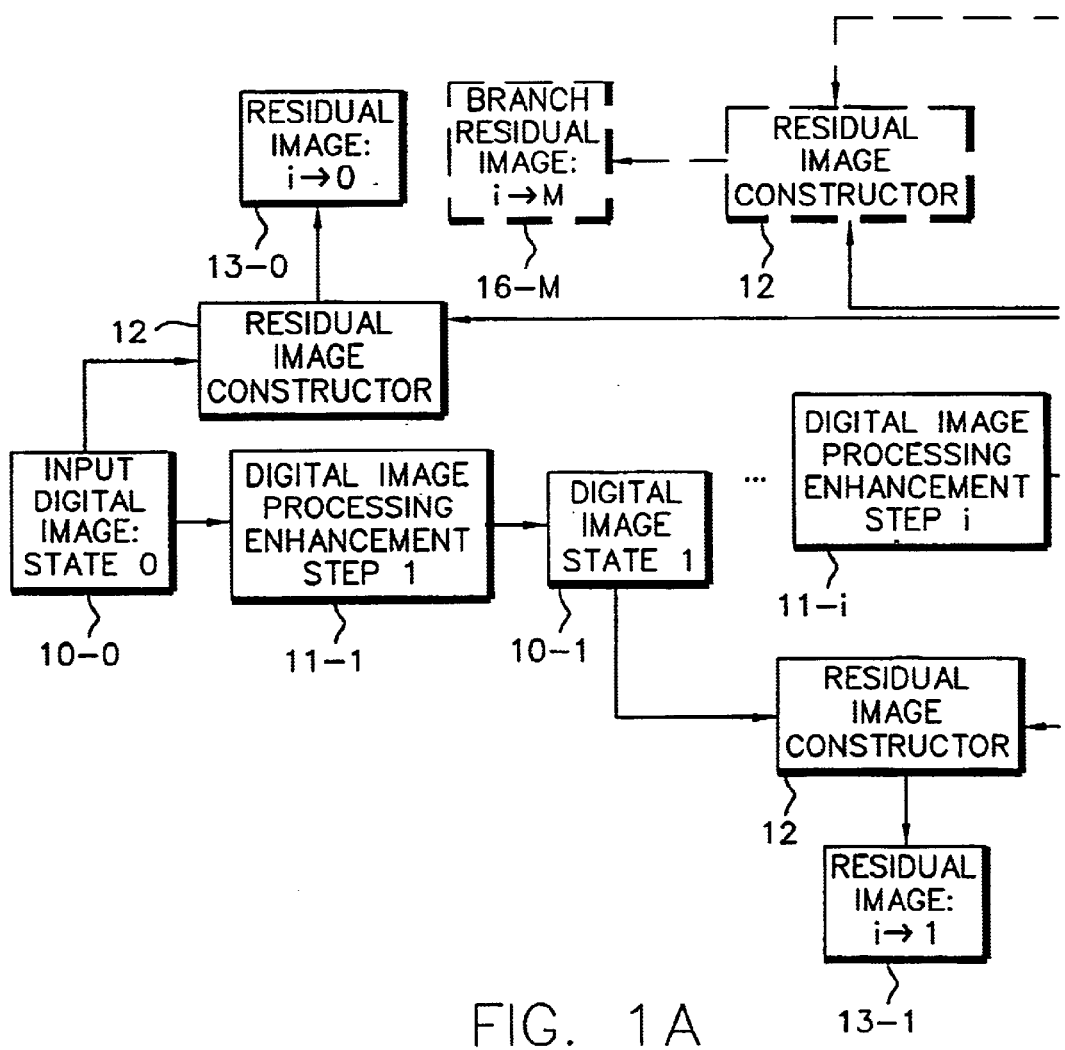
Figure 1B:
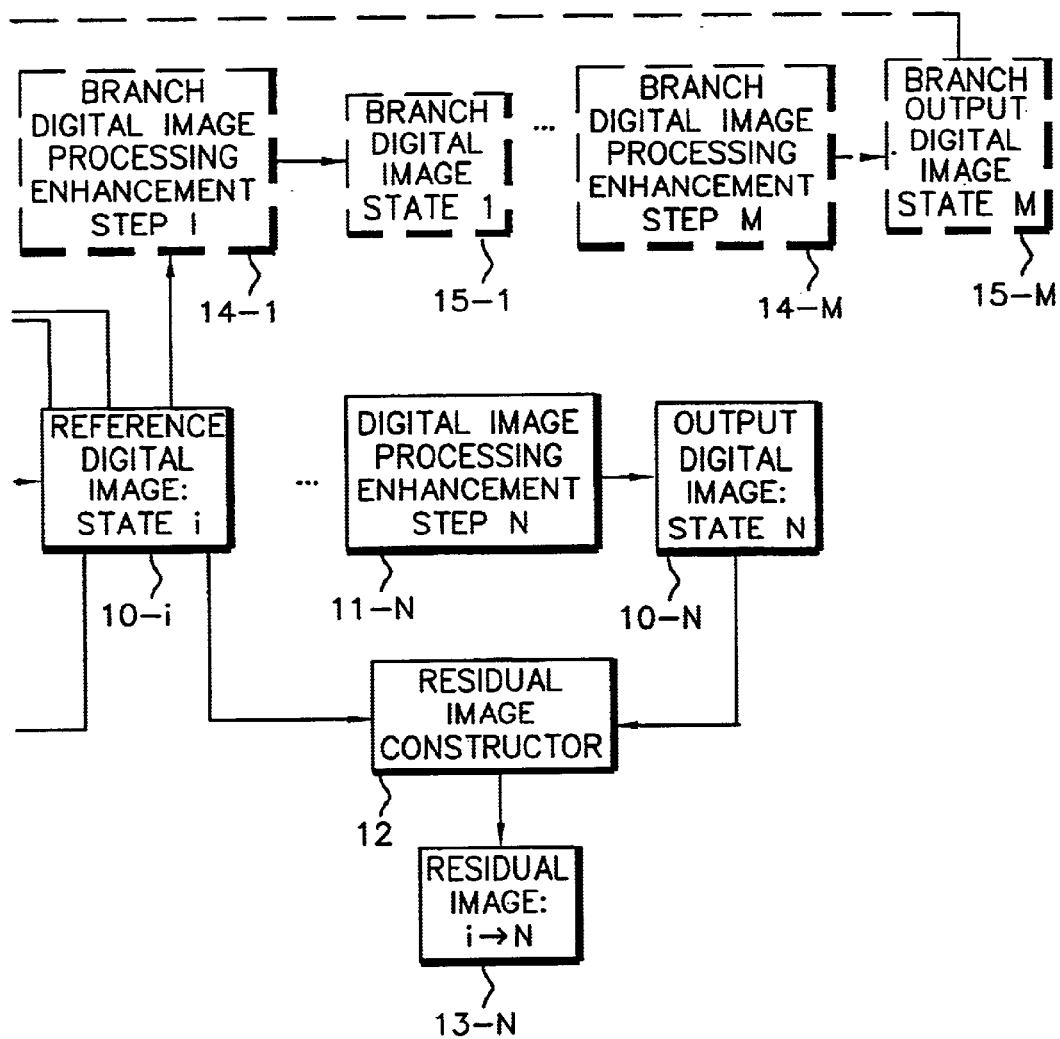

One preferred embodiment of the present invention is shown in FIG. 1. An input digital image 10-0 (in image processing state 0) is provided as the input to an imaging chain that includes a series of digital image processing enhancement steps 11-1 to 11-N. The output of each digital image processing enhancement step is another digital image 10-1 to 10-N. Each digital image is in a different image processing state. In FIG. 1, one of the digital images 10-0 to 10-N is designated to be a reference digital image 10-i in a reference image processing state; in general, a plurality of digital images may be designated to be reference digital images. Using a residual image constructor 12, one or more residual images 13-1 to 13-N can be determined representing differences between the reference digital image 10-i and one or more of the remaining digital images 10-0 to 10-N.

In a preferred embodiment of the present invention, the residual images 13-1 to 13-N are associated with the reference digital image 10-i and stored in digital memory. For example, the residual images 13-1 to 13-N can be stored as metadata in a digital image file containing the reference digital image 10-i. Alternatively, the reference digital image 10-i can be stored in one digital image file, and the residual images 13-1 to 13-N can be stored in one or more different, associated image file(s). In either case, whether the residual images are stored as metadata within the digital image file containing the reference image or whether the residual images are stored in separate files, the residual images can be stored in long-term, nonvolatile digital memory to ensure that any of the original digital images 10-1 to 10-N can be reconstructed at a later time. When desired, the residual images 13-1 to 13-N can be used, together with the reference digital image 10-i, to reconstruct one or more of the non-reference digital images 10-0 to 10-N, avoiding the need to store a full digital image for each of the different, non-reference, image processing states.

As shown in FIG. 1, an imaging chain can be comprised of a series of digital image processing enhancement steps. The term "processing enhancement step" refers to any image processing technique that improves a digital image. Example techniques include noise removal, edge enhancement, sharpness adjustment, color adjustment (including changing colors), tonescale adjustment, and the customization of the digital image for a particular application (including the addition of information such as text and borders, and other methods of changing digital image content). Image compression is not classified as a digital image processing enhancement step because compression techniques do not enhance a digital image. Rather, the purpose of compression is to reduce the image storage requirements while maintaining the appearance of the image in the image processing state prior to compression and to facilitate image transfer. However, a compressed image can be used as an input digital image for the present invention, and compression can be applied subsequently to the reference digital images(s) and residual image(s) resulting from the present invention. It may be desirable in some cases to alter one or more digital image processing enhancement steps to accommodate different user preferences, or different applications or devices. It is therefore useful to be able to return to intermediate image processing states in order to modify the imaging chain accordingly. For example, the amount of sharpness adjustment may need to be reduced, if the digital image is to be rendered for an output device that degrades image sharpness less than a default output device. Similarly, it may be desirable to modify the amounts of color adjustment and/or tonescale adjustment.

Examples of a color-adjustment step include a color-balance operation, a fade-correction operation, a change in saturation, a hue rotation, and a change in color gamut. Examples of a tonescale-adjustment step include an exposure compensation, a change in dynamic range, a change in linear contrast, a nonlinear tonescale mapping, and a histogram normalization. Examples of a sharpness-adjustment step include a global linear sharpening operation, a global nonlinear sharpening operation, an unsharp-masking operation, and a locally-adaptive sharpening operation. There are also many other types of digital image processing enhancement steps that can be applied to a digital image. Other digital image processing enhancement steps that would commonly be found in imaging chains include capture-process-correction steps, defect-correction steps, and artistic-rendering steps. Capture-process-correction steps include the correction of optical aberrations (e.g. defocus, tilt, spherical aberration, coma, astigmatism, distortion, and chromatic aberration), geometrical effects (e.g. perspective correction), sensor effects (e.g. CFA interpolation, non-uniformity correction, and noise reduction), and illuminant effects (e.g. over-exposure or under-exposure, illuminant fall-off and lens flare). Defect-correction steps include scratch and crease reduction, dust reduction, grain reduction, red-eye reduction, blemish removal, and obscenity removal. Artistic-rendering steps include sepia toning, conversion from color to black and white, morphing, composition with graphics, and localized edits. It will be obvious to one skilled in the art that there are many additional types of digital image processing enhancement steps that could be included in imaging chains. In general, a given operation may affect only a subset of the pixels in the digital image on which it operates.

As was implied above, residual images can be used for a variety of purposes. For example, residual images provide a relatively efficient mechanism by which to store information about multiple image processing states. They permit the targeting of digital images for different fulfillment options, user preferences, etc., without requiring the storage of multiple digital images, and without the use of image processing scripts. Residual images also provide an efficient mechanism by which to exchange image-manipulation information between two, possibly remote, systems. For example, a user may apply a color-adjustment step to a digital image and transfer a determined residual to a networked image fulfillment server. This server can use the residual image to apply modifications to a locally-stored copy of the corresponding reference digital image, without requiring any knowledge about the actual manipulations applied to the remotely stored reference digital image. In general, a residual image can represent the result of any image processing operation(s) performed in one location or by one image processing system, and can be used to convey that result to another location or to another image processing system.

Residual images can also act as a mechanism by which to parameterize different digital image processing enhancement steps and system characteristics. For example, the determination of a residual image from a digital image in a noise-cleaned image processing state and a digital image in a pre-noise-cleaned image processing state can provide information about the noise content of a digital image. It will be obvious to one skilled in the art that there are many other uses for residual images.

In a variation of the present invention, the digital image processing enhancement steps applied in an imaging chain can exist along parallel image processing paths, rather than in sequence - thus creating branches in the imaging chain. An example of this variation is shown in FIG. 1, using dashed lines. In this case, one or more branch digital image processing enhancement steps 14-1 to 14-M are applied to a digital image in some intermediate image processing state. The example in FIG. 1 shows the digital image corresponding to this intermediate image processing state to be the reference digital image 10-i; in general, the branch can be formed from any of the digital images, including the input digital image 10-0. The output of each branch digital image processing enhancement step is a branch digital image 15-1 to 15-M representing a different branch image processing state.

Using a residual image constructor 12, one or more branch residual images can be determined representing differences between the reference digital image 10-i and one or more of the branch digital images 15-1 to 15-M. In FIG. 1, a branch residual image 16-M is shown only for the branch output digital image 15-M. However, it should be understood that residual images can be formed for any of the other branch digital images as well. There are many possible uses for branch imaging chains. For example, the branch imaging chains can be used to form digital images optimized for fulfillment on different output devices. Other applications include the creation of different artistic renditions and the preservation of different user preferences. Therefore, residual images can be used to retain information about alternative image processing results, without needing to store a full digital image for each different output.

In FIG. 1, the reference digital image 10-i is designated to correspond to an intermediate image processing state in the imaging chain. In general, any digital image may be designated as a reference digital image. For example, the input digital image 10-0 may be selected as a reference digital image. This has the advantage that the original (i.e. input) digital image data is kept intact and is readily available for subsequent digital processing. The output digital image 10-N may also be selected as a reference digital image. This has the advantage that the final, rendered data is kept intact and is adapted for immediate display/fulfillment on a reference output device. If an output device having characteristics similar to the reference output device is available, then the reference digital image corresponding to the output digital image 10-N can be previewed on this device. This has the advantage of allowing the user to prejudge the image processing results prior to finalizing the image processing operations.

From FIG. 1, it is apparent that the use of the residual images 13-1 to 13-N allows a digital image to be processed to a different point (i.e. image processing state) in the imaging chain so that, for example, the digital image can be targeted for a different intent. In a preferred embodiment of the present invention, the residual images 13-1 to 13-N are associated with a single reference digital image 10-i. The reconstruction of a digital image in a non-reference processing state can be accomplished using a single residual image, corresponding to the image processing state of interest, together with the reference digital image 10-i. In other words, residual images can be used independently from one another.

Figure 2:
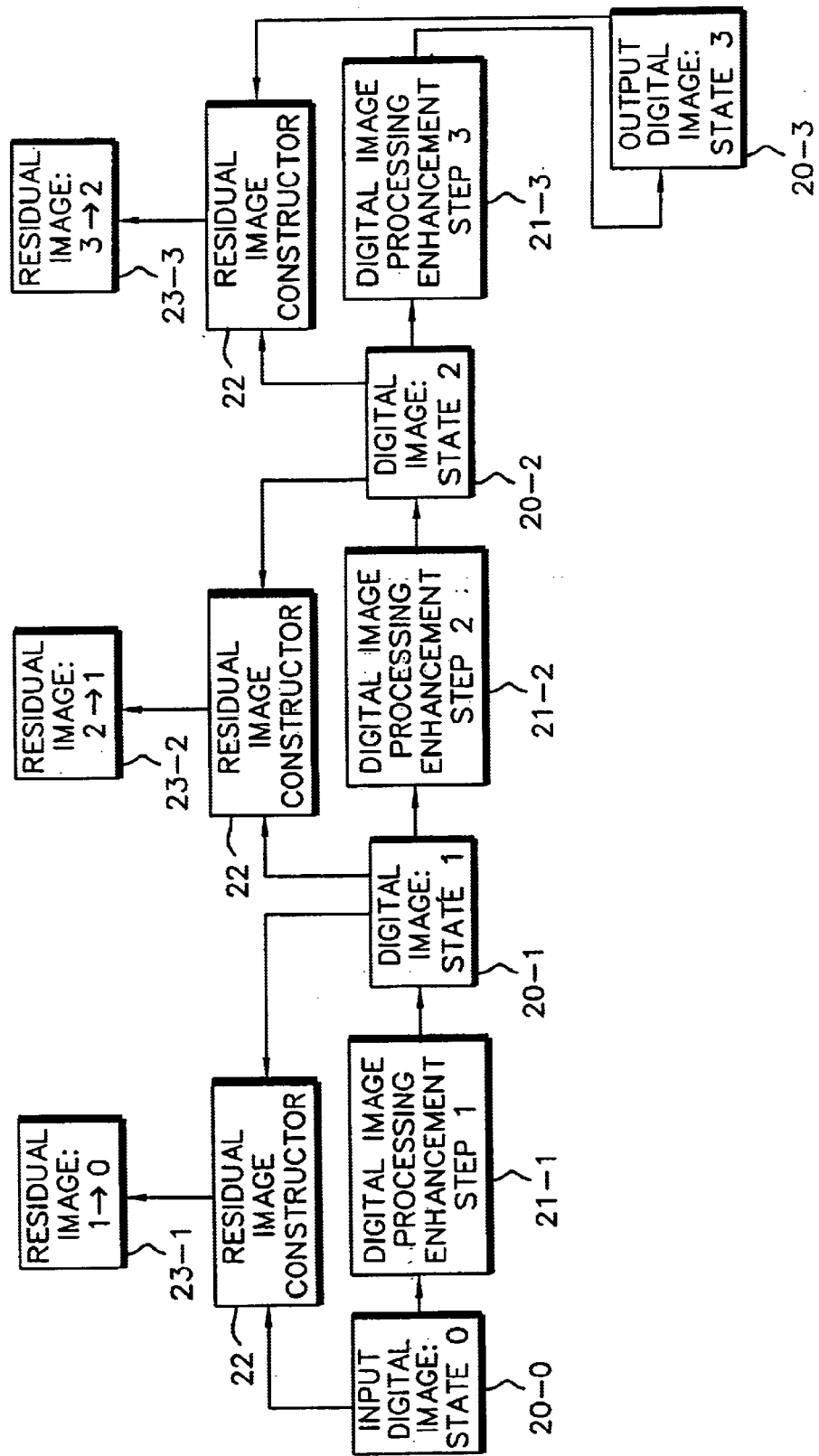
FIG. 2 is a schematic showing various image processing states that can be used in accordance with the present invention to form interdependent residual images.

In another preferred embodiment, digital images in different image processing states can be formed through the serial application of several different residuals, each associated with a different reference image processing state. The determination of such interdependent residual images is illustrated in FIG. 2. In this case an input digital image 20-0 (in image processing state 0) is provided as input to an imaging chain that includes a series of digital image processing enhancement steps 21-1 to 21-3. The output of each digital image processing enhancement step is another digital image 20-1 to 20-3. Each digital image is in a different image processing state. Each of the processed digital images 20-1 to 20-3 is designated to be a reference digital image for the corresponding digital image processing enhancement steps 21-1 to 21-3, respectively. Using a residual image constructor 22, a set of residual images 23-1 to 23-3 is determined representing the differences between the reference digital image for a given digital image processing enhancement step (i.e. the digital image output by the digital image processing enhancement step) and the digital image prior to that digital image processing enhancement step. For example, the residual image 23-2 is determined by the residual image constructor 22 using the reference digital image 20-2 (i.e. the digital image in image processing state 2) and the digital image prior to that digital image processing enhancement step 20-1 (i.e. the digital image in image processing state 1). In a preferred embodiment of this invention, the final output digital image 20-3 is stored in digital memory together with the set of residual images 23-1 to 23-3. The set of residual images 23-1 to 23-3 can be used in combination with the output digital image 20-3, to reconstruct digital images in another image processing state. The preferred embodiment designates the post-processing state to be the reference digital image for a given digital image processing enhancement step. It should be understood that other schemes can also be used.

In a preferred embodiment of the present invention, the residual image information is encoded as the differences in code values between digital images in two different image processing states. In some cases, it may be desirable to encode one or more residual image(s) using a spatial frequency decomposition technique where the lower spatial frequency components of the residual image can be separated from the higher spatial frequency components. The use of a spatial frequency decomposition technique has benefits for the storage of residual images. For example, it is well known in the art that wavelet transforms can be used to affect spatial frequency decomposition of digital images. The use of a spatial frequency decomposition technique can also provide useful information to algorithms that use the residual images. For example, the information in various spatial frequency bands of the residual image created for a sharpness-adjustment step can be used to infer information about the noise characteristics of the digital image. Alternatively, the residual image information may be encoded as a parameterized representation of a specific processing operation, or as one or more mathematical transformations describing the differences between the digital images in two image processing states. It can be beneficial to use a logic tree to determine which method is the most applicable for a given case, i.e. on the basis of storage limitations, processing speed requirements, etc. In a preferred embodiment, access to any intermediate image processing state in an imaging chain can be achieved using an efficient combination of residual images and parameterized representations of digital image processing enhancement steps.

In a preferred embodiment of the present invention, the spatial resolution of the residual images is the same as in the corresponding reference digital image. More generally, one or more of the residual images can be stored at a different spatial resolution than the associated reference digital image. This reduces the amount of digital memory needed to store the residual image(s), in the case where a lower-resolution residual image is formed. The different-resolution residual image(s) can be resampled at a later time to the spatial resolution of the corresponding reference digital image(s), for the subsequent formation of digital images in different image processing states.

In a preferred embodiment of the present invention, a single residual image is determined representing the differences between the digital image in an arbitrary image processing state and the digital image in the reference image processing state. In general, a set of residual images can be formed such that each residual image in the set corresponds to a subset of pixels in the associated reference digital image. In this way, the complete residual image(s) can be stored as set(s) of residual image tiles. This can be useful, for example, in cases where there is a limitation on the size of metadata tags that can be stored with a digital image. It can also be advantageous in situations where only a portion of the digital image is modified and/or displayed, to maximize processing speed and minimize digital memory requirements. Similarly, in cases where a given processing operation affects only a subset of the pixels in the digital image, it can be advantageous to determine a residual image for only the affected pixels.

In a preferred embodiment of the present invention, the number of color channels, or color planes, in the residual images is the same as in the corresponding reference digital image. In general, one or more residual image(s) can be determined using a subset of the color channels in the associated digital images. This can reduce the digital storage requirements for the residual(s). For example, in situations in which the majority of image structure information is contained in one channel of a multi-channel digital image, a single-channel sharpness-adjustment residual image can be formed. In some cases, it can be desirable to determine the residual image for a color channel that is not one of the original color channels in the digital image. For example, a luminance channel can be calculated from the red, green, and blue channels of a digital image. In this case, changes in luminance resulting from a given digital image processing enhancement step can be encoded by determining a residual image for the luminance channel alone.

In cases where a number of distinct component operations are applied to a digital image during a given digital image processing enhancement step in an imaging chain, it may be beneficial to determine a separate residual image for each component operation. This may permit subsequent modification of individual component operations without affecting the remainder of the processing involved in that particular digital image processing enhancement step. For example, a digital image processing enhancement step identified as "capture-process-correction" may include the component operations of noise reduction, and exposure correction. In some instances, it may be desirable to determine separate residual images for the noise reduction and then for the exposure correction, so that later adjustments in the noise reduction can be made without affecting the exposure correction.

In certain cases, it may be necessary to reduce the amount of digital memory required to store one or more residual image(s). In such cases, a data compression technique can be applied. This can effectively reduce the size of the residual image, without affecting its usefulness.

Figure 3:
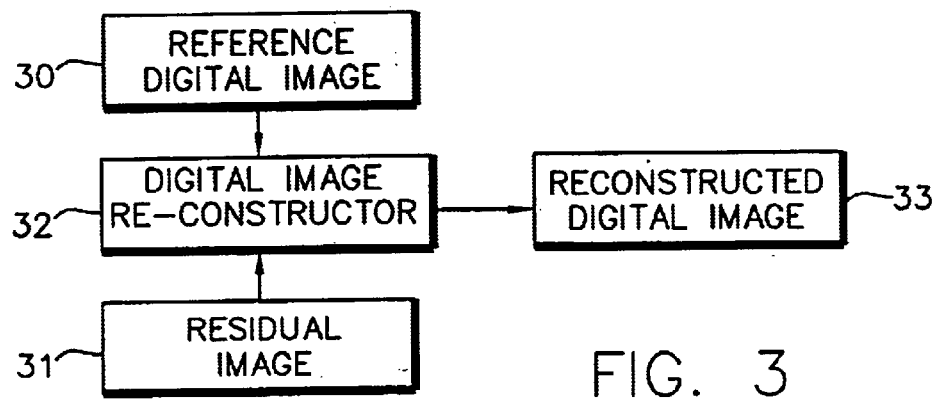
FIG. 3 is a schematic showing how a residual image and a reference digital image can be used to form a reconstructed digital image.

The residual image(s) determined using the methods of FIG. 1 can be used, together with the reference digital image(s), to form one or more reconstructed digital image(s) in one of the image processing states of the original imaging chain. This is illustrated in FIG. 3. In this case, a reference digital image 30 in a reference image processing state is combined with a corresponding residual image 31, using a digital image re-constructor 32 to form a reconstructed digital image 33. The reconstructed digital image 33 is in the original image processing state that was used to compute the residual image 31. As was discussed above, this image processing state can correspond to an image processing state either prior to or following the reference image processing state in the imaging chain, or it can correspond to an image processing state in a branch imaging chain. Alternatively, a series of interdependent residual images determined using the method of FIG. 2 can be used, together with the reference digital image(s), to form one or more reconstructed image(s) in different image processing states. In this case, multiple residual images can be used in combination to effectively step through the image processing states of the original imaging chain.

One or more residual image(s), together with one or more corresponding reference digital image(s), can be used in the formation one or more different digital image(s) corresponding to new image processing state(s)—i.e. image processing state(s) that did not exist in the original imaging chain. For example, one or more residual image(s) and corresponding reference digital image(s) can be used to reconstruct an intermediate image processing state in the original imaging chain. An alternate imaging chain can then be applied to form a new digital image. For example, a new digital image can be formed that is appropriate for display on an output device having characteristics different than the output device for which the original output digital image was optimized. For example, a digital image intended for display on a softcopy monitor can be re-purposed for fulfillment as ink jet hardcopy. Alternatively, it may be useful to specify a desirable modification to the original imaging chain to form a new digital image in a new image processing state. For example, if one of the digital image processing enhancement step in the original imaging chain is a sharpness-adjustment step, it may be desirable to modify the amount of sharpness adjustment that was applied to the digital image. In this case, the residual image(s), together with the reference digital image(s), can be used to reconstruct an image processing state prior to the sharpness-adjustment step in the imaging chain. The amount of sharpness adjustment can then be modified accordingly. The desirable modification to the digital image may be interactively user-specified or, alternatively, may be determined using an automatic algorithm.

Figure 4:
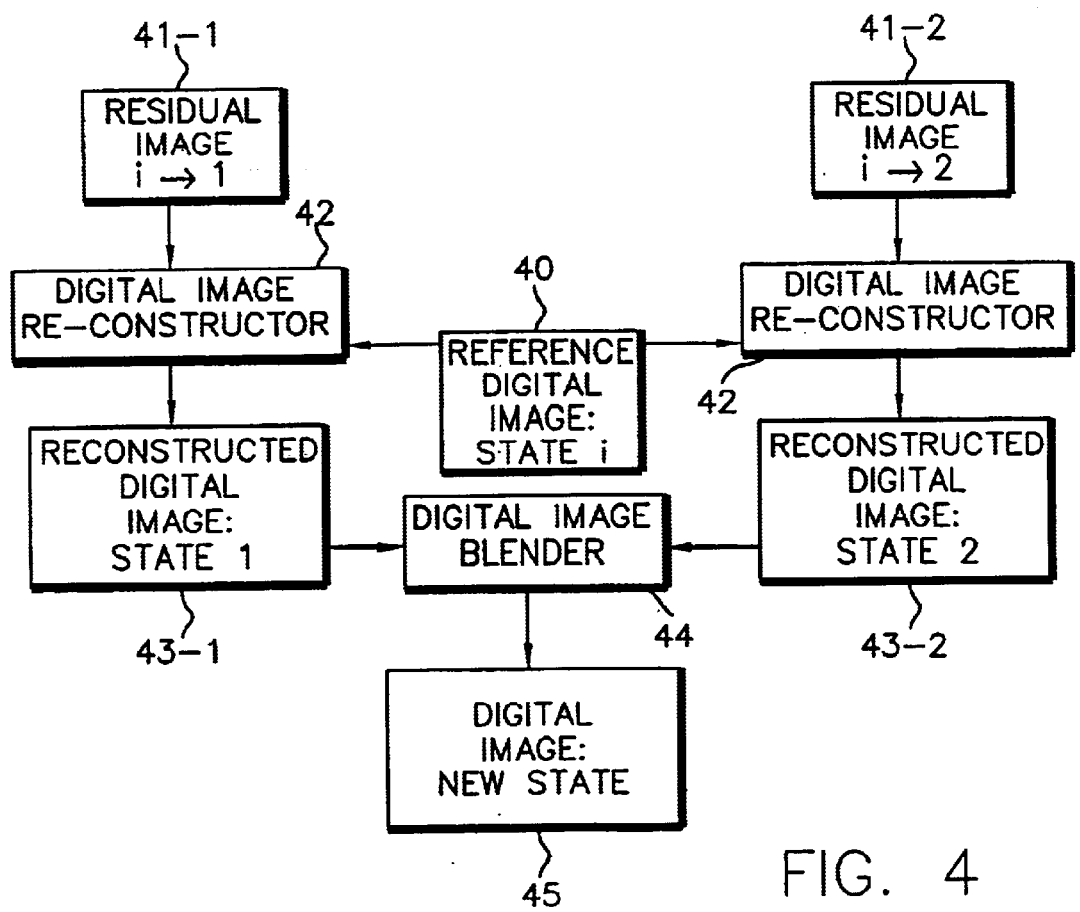
FIG. 4 is a schematic showing how residual image(s) and reference digital image(s) can be used to form a digital image in a new image processing state by blending digital images.

Another example of using residual images to form a digital image in a new image processing state is illustrated in FIG. 4. In this figure, a reference digital image 40 in a reference image processing state is combined with residual images 41-1 and 41-2 using a digital image re-constructor 42 to form reconstructed digital images 43-1 and 43-2. A digital image blender 44 is used to form a new digital image 45 by forming a numerically-weighted combination of the reconstructed digital images 43-1 and 43-2. For example, if one reconstructed digital image 43-1 corresponds to a contrast-adjusted image processing state and the other reconstructed digital image 43-2 corresponds to a saturation-adjusted image processing state, the digital image blender 44 can individually weight each reconstructed digital image to adjust the contrast and color saturation of the new digital image 45. It may be desirable in some applications to allow users to interactively control the weighting procedure according to their subjective preferences or to manage the weighting using an automatic algorithm.

Figure 5:
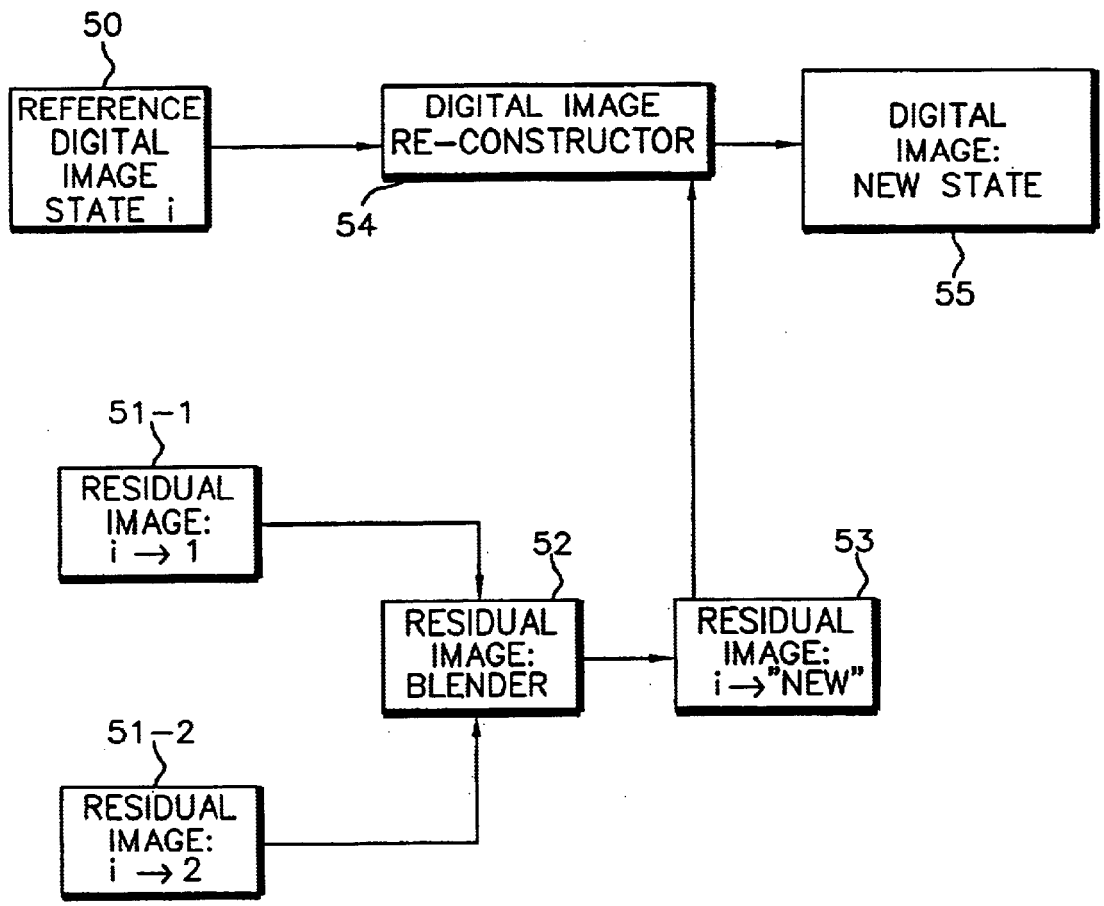
FIG. 5 is a schematic showing how residual image(s) and reference digital image(s) can be used to form a digital image in a new image processing state by blending residual image(s).

It should be noted that a similar result can be obtained by forming a new residual image that is a weighted combination one or more of residual image(s). An example of this is shown in FIG. 5. This figure illustrates a new residual image 53 that is formed by a weighted combination of residual images 51-1 and 51-2. The new residual image 53 can then be combined with the reference digital image 50 using a digital image re-constructor 54 to form a new digital image 55.

As was mentioned above, one or more residual image(s) can be encoded using a spatial frequency decomposition technique. In these cases, a digital image in a new image processing state can be formed by individually adjusting the various spatial frequency bands of the residual image and then combining the new residual image with the corresponding reference image. For example, in some cases, the adjustment of certain spatial frequency bands can be used to modify the sharpness of a digital image.

The invention has been described in detail with particular reference to certain preferred embodiments thereof, but it will be understood that variations and modifications can be effected within the spirit and scope of the invention.

PARTS LIST

| | |
|---|---|
| 10-0 | input digital image |
| 10-1 through 10-N | processed digital images |
| 10-i | reference digital image |
| 11-1 through 11-N | digital image processing enhancement steps |
| 12 | residual image constructor |
| 13-1 through 13-N | residual images |
| 14-1 through 14-M | branch digital image processing enhancement steps |
| 15-1 through 15-M | branch digital images |
| 16-M | branch residual image |
| 20-0 | input digital image |
| 20-1 through 20-3 | processed digital images (used as reference images) |
| 21-1 through 21-3 | digital image processing enhancement steps |
| 22 | residual image constructor |
| 23-1 through 23-3 | residual images |
| 30 | reference digital image |
| 31 | residual image |
| 32 | digital image re-constructor |
| 33 | reconstructed digital image |
| 40 | reference digital image |
| 41-1 | residual image (for reference state and state 1) |
| 41-2 | residual image (for reference state and state 2) |
| 42 | digital image re-constructor |
| 43-1 | reconstructed digital image (state 1) |
| 43-2 | reconstructed digital image (state 2) |
| 44 | digital image blender |
| 45 | digital image (new state) |
| 50 | reference digital image |
| 51-1 | residual image (for reference state and state 1) |
| 51-2 | residual image (for reference state and state 2) |
| 52 | residual image blender |
| 53 | residual image (for reference state and new state) |
| 54 | digital image re-constructor |
| 55 | digital image (new state) |

What is claimed is:

1. A method for representing a digital image in a plurality of image processing states using at least one reference digital image and at least one residual image comprising the steps of:

(a) manipulating an input digital image using at least one digital image processing enhancement step to form at least one additional digital image in a different image processing state;

(b) designating at least one of the digital images to be a reference digital image in a reference image processing state; and (c) determining at least one residual image representing differences between one of the reference digital images and one of the additional digital images, whereby the residual image(s) and the reference digital image(s) can be used to form digital image(s) in different image processing states.

2. The method of claim 1 wherein the residual image(s) are associated with the appropriate reference digital image (s).

3. The method of claim 2 wherein at least one residual image is stored as metadata in a digital image file.

4. The method of claim 2 wherein the reference digital image is stored in one digital image file, and at least one residual image is stored in a different, associated digital image file.

5. The method of claim 1 wherein at least one reference digital image is the input digital image.

6. The method of claim 1 wherein at least one reference digital image is a final processed digital image in a final image processing state.

7. The method of claim 6 wherein at least one reference digital image is adapted for display on a reference output device.

8. The method of claim 7 further including the step of previewing the digital image by displaying at least one reference digital image on an output device having characteristics that are similar to the reference output device.

9. The method of claim 7 further including the step of using at least one residual image together with the associated reference digital image to form a modified digital image appropriate for display on an output device having different characteristics than the reference output device.

10. The method of claim 1 wherein at least one reference digital image is a color digital image having a plurality of color channels and at least one of the residual images is determined using only a subset of the color channels.

11. The method of claim 1 wherein at least one residual image is of a different spatial resolution than the associated reference digital image.

12. The method of claim 11 wherein the different-resolution residual image is resampled to form a residual image having the same spatial resolution as the associated reference digital image.

13. The method of claim 1 wherein individual residual images are determined to store the changes introduced by individual digital image processing enhancement steps.

14. The method of claim 1 wherein the residual images are determined such that they can be used independently, with the reference digital image, to form different digital images.

15. The method of claim 1 wherein at least two residual images correspond to image processing states in branch imaging chains.

16. The method of claim 1 wherein a set of residual images is determined such that each residual image in the set of residual images corresponds to a subset of pixels in the associated reference digital image.

17. The method of claim 1 wherein residual image data is determined only for the subset of pixels affected by the digital image processing enhancement step(s).

18. The method of claim 1 wherein at least one residual image is encoded as the differences in code values between digital images in two different image processing states.

19. The method of claim 1 further including using a spatial frequency decomposition technique on at least one residual image to produce one or more spatial-frequency-decomposed residual image(s).

20. The method of claim 19 wherein individual spatial frequency bands of the spatial-frequency-decomposed residual image(s) are individually adjusted and used to form one or more digital image(s) in image processing state(s) different from the original image processing states.

21. The method of claim 1 wherein a data compression technique is applied to at least one residual image.

22. The method of claim 1 wherein at least one digital image processing enhancement step is a capture-process-correction step.

23. The method of claim 1 wherein at least one digital image processing enhancement step is a tonescale-adjustment step.

24. The method of claim 1 wherein at least one digital image processing enhancement step is a color-adjustment step.

25. The method of claim 1 wherein at least one digital image processing enhancement step is a defect-correction step.

26. The method of claim 1 wherein at least one digital image processing enhancement step is a sharpness-adjustment step.

27. The method of claim 1 wherein at least one digital image processing enhancement step is an artistic-rendering step.

28. The method of claim 1 wherein at least one digital image processing enhancement step affects only a subset of pixels in the digital image on which it operates.

29. A method of forming one or more reconstructed digital image(s) from one or more reference digital image(s) and one or more residual image(s) which are produced by the steps of; manipulating an input digital image using at least one digital image processing enhancement step to form at least one additional digital image in a different image processing state; designating at least one of the digital images to be a reference digital image in a reference image processing state; and determining at least one residual image representing differences between one of the reference digital images and one of the additional digital images, whereby the residual image(s) and the reference digital image(s) can be used to form digital image(s) in different image processing states; such method comprising the steps of:

(a) receiving one or more reference digital image(s) and one or more residual image(s); and (b) combining one reference digital image and one or more residual image(s) to for each of one or more reconstructed digital image(s) corresponding to original image processing state(s).

30. A method of forming one or more new digital image(s) from one or more reference digital image(s) and one or more residual image(s) which are produced by the steps of; manipulating an input digital image using at least one digital image processing enhancement step to form at least one additional digital image in a different image processing state; designating at least one of the digital images to be a reference digital image in a reference image processing state; and determining at least one residual image representing differences between one of the reference digital images and one of the additional digital images, whereby the residual image(s) and the reference digital image(s) can be used to form digital image(s) in different image processing states; such method comprising the steps of:

(a) receiving one or more reference digital image(s) and one or more residual image(s); and (b) combining one or more reference digital image(s) and one or more residual image(s) to form each of one or more digital image(s) in image processing state(s) different from the original image processing states.

31. The method of claim 30 further including forming a digital image from a weighted mixture of two or more different image processing states.

32. The meth of claim 31 wherein the process of determining the weighted mixture of image processing states includes the step of numerically scaling at least one of the associated residual images.

33. The method of claim 31 wherein the weighted mixture of image processing states is interactively user specified.

34. A method for representing and manipulating a digital image in a plurality of image processing states using at least one reference digital image and at least one residual image comprising the steps of:

(a) manipulating an input digital image using at least one digital image processing enhancement step to form at least one additional digital image having different image processing state;

(b) designating at least one of the digital images to be a reference digital image for a reference image processing state;

(c) determining at least one residual image representing differences between one of the reference digital images and one of the additional digital images, whereby the residual image(s) and the reference digital image(s) can be used to form digital image(s) in different image processing states; and (d) using at least one residual image together with the appropriate reference digital image and a specified desirable modification to the digital image to produce a modified digital image.

35. The method of claim 34 wherein the desirable modification is interactively user-specified.

36. The method of claim 34 wherein the desirable modification is determined by applying an automatic algorithm.

* * * * *

UNITED STATES PATENT AND TRADEMARK OFFICE
CERTIFICATE OF CORRECTION

PATENT NO.     : 6,795,585 B1
DATED          : September 21, 2004
INVENTOR(S)    : Robert J. Parada Jr. et al.

It is certified that error appears in the above-identified patent and that said Letters Patent is hereby corrected as shown below:

Column 12,
Line 31, "for" should read -- form --
Line 58, "meth" should read -- method --

Signed and Sealed this

Twenty-sixth Day of July, 2005

JON W. DUDAS
*Director of the United States Patent and Trademark Office*